United States Patent [19]

Hickman

[11] Patent Number: 4,532,988
[45] Date of Patent: Aug. 6, 1985

[54] SUCKER ROD SCRAPER METHOD AND DEVICE

[75] Inventor: Alvin E. Hickman, Pampa, Tex.
[73] Assignee: Walter Beal, Odessa, Tex.
[21] Appl. No.: 533,061
[22] Filed: Sep. 15, 1983
[51] Int. Cl.³ ............................................. B23K 31/02
[52] U.S. Cl. .................................... 166/176; 228/135; 228/173.6
[58] Field of Search .................. 228/135, 173 C, 182, 228/222; 166/176

[56] References Cited

U.S. PATENT DOCUMENTS

| | | | |
|---|---|---|---|
| 2,453,199 | 11/1948 | Crall | 166/176 |
| 2,733,768 | 2/1956 | Tripplehorn | 166/176 |
| 2,772,741 | 12/1956 | Polson | 166/176 |
| 2,928,473 | 3/1960 | Tripplehorn | 166/176 |
| 3,499,210 | 3/1970 | Schellstede et al. | 29/447 |
| 4,266,711 | 5/1981 | Tranberg | 228/135 |
| 4,365,736 | 12/1982 | Stumm | 228/135 X |

*Primary Examiner*—Kenneth J. Ramsey
*Attorney, Agent, or Firm*—Marcus L. Bates

[57] ABSTRACT

A plurality of sucker rod scrapers are securely attached in spaced apart relationship to a length of sucker rod for scraping paraffin deposits from the interior of a tubing string, thereby obviating obstruction to the flow of oil therethrough by maintaining a satisfactory effective flow area within the tubing string. The scrapers each have a spiraled scraping surface wound helically about the sucker rod and attached at each opposed end thereof by the provision of a clamping member which includes a U-band and a heat shield. The U-band has confronting marginal edge portions which overlap the edge portions of the heat shield. The heat shield has a slot formed centrally therein for receiving a tab located at either of the opposed ends of the spiraled scraper. The confronting edges of the U-band are welded to one of the marginal opposed ends of the scraper, while the heat shield prevents the metal of the sucker rod being elevated to a temperature which changes the characteristics thereof.

15 Claims, 7 Drawing Figures

U.S. Patent   Aug. 6, 1985   4,532,988
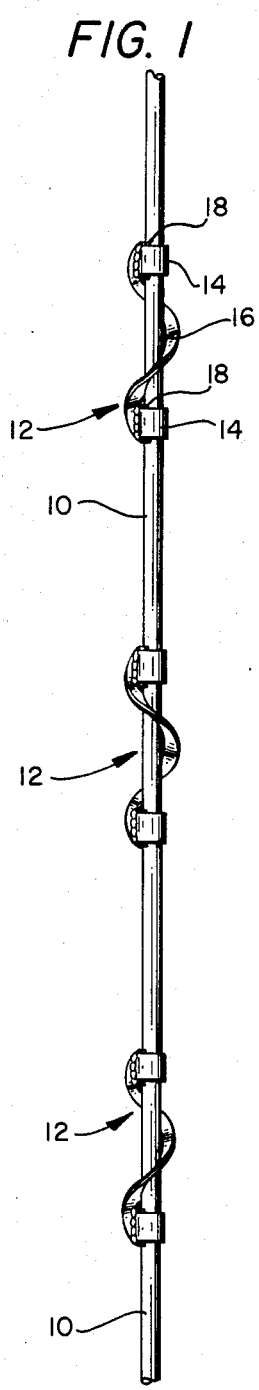
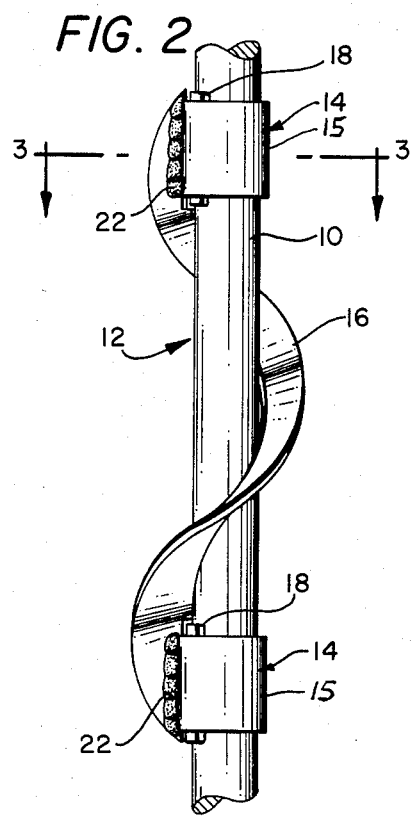
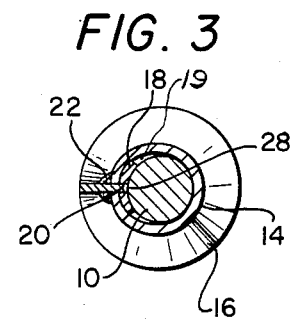
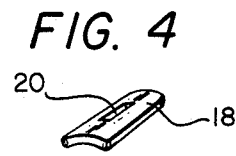
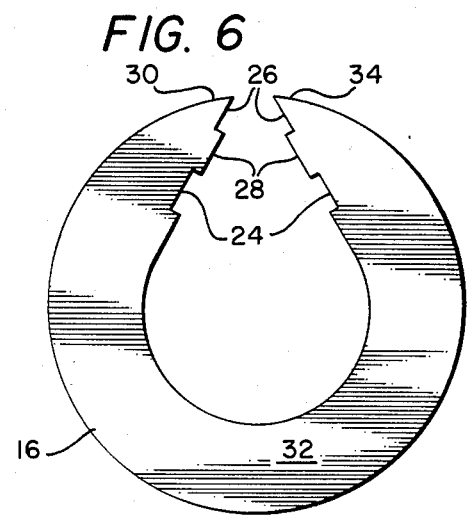
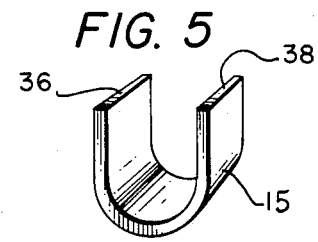
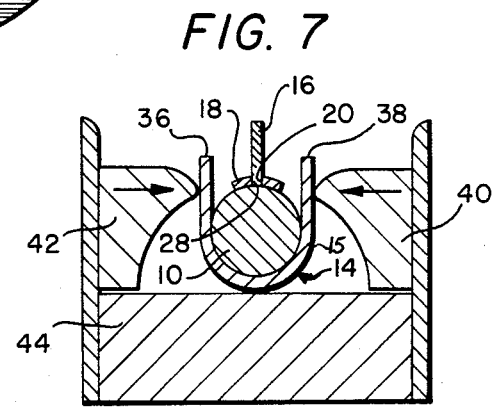

SUCKER ROD SCRAPER METHOD AND DEVICE

BACKGROUND OF THE INVENTION

Attachment of a spiraled paraffin scraper to a sucker rod is generally known in the art as evidenced by U.S. Patents to Troutman, U.S. Pat. No. 3,410,349; Polson U.S. Pat. No. 2,772,741; Triplehorn U.S. Pat. No. 2,733,768 and 2,928,473; Neumeyer U.S. Pat. No. 1,639,660; Winegar U.S. Pat. No. 2,979,133; and Crayel U.S. Pat. No. 2,453,199.

In Troutman, the scrapers are attached to the rod by a U-band having tabs placed through slots and bent back to mechanically secure the scraper and U-band to one another and to the rod. In Polson the scraper and the U-band are directly welded to one another, with there being no provision for protecting the underlying surface of the sucker rod, and accordingly, the hardness as well as the alloy composition might be changed as the temperature of the rod surface exceeds a certain known value.

Schellsted et al U.S. Pat. No. 3,499,210 teaches a method of mounting a protector on a drill pipe. The protector is in the form of a split sleeve 20 having a slot 34 formed internally thereof within which a back-up strip 35 is received; and thereafter a bead 44 of welding then reattaches the confronting ends 31 of the sleeve 20 together. As the sleeve cools, it is heat shrunk about the drill pipe.

Reference is made to these previously issued patents for further background of the present invention, as well as to the references cited therein.

The present invention differs from the above cited art of record in that a sucker rod and paraffin scraper combination, sometime referred to as a paraffin scraper and rod guide, is arranged in spaced relationship along a string of sucker rod, in alternating relationship with respect to one another, so that adjacent scrapers may be provided with a right handed and left handed pitch spiral about the rod axis, thereby eliminating any tendency of the rods to unscrew respective to one another, and thereby providing a balanced rod string. More distinctly, each scraper assembly is provided with a spiral blade having opposed ends which terminate in projecting tabs. The tabs are formed by cut-outs. A U-band of limited longitudinal length is bent about the rod surface with the confronting edges thereof being placed closely adjacent to one of the tabs located on the scraper. A heat shield underlies both the confronting edge portions of the U-band and further includes a slot within which the tab of the scraper is received. The confronting ends of the U-band are welded to the scraper at a location adjacent to the tabs, while the heat shield isolates and prevents damage to the underlying surface of the sucker rod.

SUMMARY OF THE INVENTION

This invention relates to a paraffin scraper and rod guide which is securely mounted to a sucker rod by a novel clamping member which enables the blade of the paraffin scraper to be welded to the clamping member by a method set forth hereinbelow. The paraffin scraper has a spiral blade concentrically disposed about the rod, and a clamping member is located at each opposed end of the blade. Each clamping member includes a U-band, the confronting edges of which are weldedly attached to one of the opposed marginal ends of the blade, with there being a heat shield underlying the marginal confronting edge portions of the U-band, so that when the adjacent U-band and blade ends are welded together, the underlying rod surface is protected from the radiant and convective heat resulting from the welding process.

The heat shield extends up to 90° about the circumferentially extending outer surface area of the rod, and preferably is provided with a slot within which there is received a tab associated with and forming an integral part of the blade. The tab preferably is made by spaced cut outs arranged in a manner which causes the tab to be perpendicularly aligned respective to the longitudinal axis of the sucker rod.

The sucker rod scrapers preferably are spaced from one another, with there being both right and left hand pitched spirals located adjacent to one another, so that alternate pitched spirals are disposed along the rod length, thereby precluding axial rotation of the rod lengths during the pumping action of the rod string.

In carrying out the method of the present invention, the slotted heat shield is curved to conform to the curvature of the rod surface. The tab formed at each end of the scraper blade is positioned with the slot. The U-band is next bent about the rod surface with the marginal confronting ends thereof overlapping the marginal edge portions of the heat shield. A welding bead is then laid down or executed to thereby weld the confronting edge portions of the U-band to the opposed sides of the scraper, with the underlying heat shield preventing the rod surface from being elevated to a temperature level which changes the characteristics of the rod surface. As the combination rod and paraffin scraper cools, the U-band contracts, thereby holding the scraper assembly with great friction to the rod surface.

The interconnected slot and tab provide a mechanical connection which enhances the structural integrity of the final rod and scraper combination. The heat shield provides a barrier which prevents the alloy of the rod from changing from its designed characteristics. The overall combination provides a clamping member which rigidly affixes the blade to the rod surface in a new and unexpected manner.

Accordingly, a primary object of the present invention is the provision of an improved paraffin scraper and rod guide affixed to the outer surface of a sucker rod by high frictional force and in a manner which precludes damage to the underlying rod surface.

Another object of the invention is to provide an improved paraffin scraper rigidly clamped to a sucker rod by welding the component parts of the scraper device together without any resultant damage to the rod surface.

A further object of the present invention is the provision of an improved paraffin scraper securely clamped to a sucker rod by an improved clamping member which is welded while positioned about the rod, but without changing the characteristics of the rod alloy.

A still further object of this invention is to provide a method of attaching a paraffin scraper to a sucker rod which includes placing a heat shield in underlying relationship respective to a U-shaped clamping member and the free marginal ends of the scraper blade in a manner which precludes damage to the underlying sucker rod.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a broken, side elevational view of a sucker rod and scraper combination made in accordance with the present invention;

FIG. 2 is a fragmented view of a length of sucker rod having a paraffin scraper and rod guide mounted thereto in accordance with the present invention;

FIG. 3 is a cross-sectional view taken along line 3—3 of FIG. 1;

FIGS. 4, 5, and 6, respectively, are detailed views of the various components used in fabricating the paraffin scraper and rod guide of FIGS. 1, 2, and 3, and, FIG. 7 is a part diagrammatical, part schematical, part cross-sectional representation of a process for building and attaching a sucker rod scraper to a sucker rod, in accordance with the present invention.

DETAILED DESCRIPTION OF THE PREFERRED EMBODIMENT

FIGS. 1 and 2 of the drawings disclose a sucker rod 10 of usual construction having a novel paraffin scraper and rod guide 12, made in accordance with the present invention, attached thereto. A clamping member 14 is positioned at each opposed end of a blade 16. The blade 16 therefore spirals about the rod surface from one to the other clamping member. The marginal opposed ends of the blade are each attached to one of the illustrated clamping members in accordance with the method of this invention, as will be more fully explained later on herein.

The inside diameter, or inside spiraled edge of the blade, preferably lies adjacent to and contacts the outer peripheral surface of the sucker rod. Each clamping member 14 includes the illustrated U-band 15. A heat shield 18, the details of which will be more fully discussed later on in this disclosure, underlies the marginal ends of the blade and the U-band.

As seen in FIGS. 2 and 3, together with other figures of the drawing, the U-band encompasses the sucker rod and a medial length of the heat band, with a marginal terminal end of the heat shield slightly extending from under the U-band. The heat shield has a width made complementary respective to the curvature of the sucker rod surface. The width of the heat shield preferably is not more than 90° of the circumferentially extending surface area of the rod. The U-band preferably has an inner peripheral surface having a curvature made complementary respective to the outer peripheral surface area of the sucker rod, at a location diametrically opposed to the heat shield. It will be noted in FIG. 3 that the U-band leaves the rod surface and is brought into contact with the outer surface of the heat shield, thereby leaving the illustrated air spaces 19 which are formed between the rod surface, the inner surface of the U-band, and the opposed edge portions of the heat shield.

As seen in FIGS. 4, 5, and 6, together with other figures of the drawing, the heat shield 18 has a slot 20 formed therein. As seen in FIGS. 2 and 3, welding 22 integrally attaches the ends of the U-band to one of the marginal ends of the blade. As seen in FIG. 6, the blade is made from a discontinuous stamped washer having spaced cut-outs 24 and 26, which leave opposed tabs 28 at each marginal free end 30, 34 thereof. The blade 16 of FIG. 6 is bent into the illustrated spiral configuration seen in FIGS. 1, 2, and 3, which is concentrically arranged respective to the longitudinal axis of the sucker rod.

The method of the invention is carried out in accordance with FIGS. 4, 5, 6, and 7, wherein a flat piece of metal is bent into the illustrated U-band 15 having the illustrated opposed legs 36 and 38. The heat shield 18 is apertured, then similarly bent, and thereafter positioned centrally between diametrically positioned movable dies 40 and 42. Means 44, preferably a large hydraulic cylinder, is connected to move dies 40 and 42 towards one another, thereby bending legs 36 and 38 about the rod surface with great force and causing the marginal ends of the legs to overlap the marginal edges of the heat shield. The ends 36 and 38 of the U-band preferably are arranged slightly spaced from the opposed faces 32 at the marginal ends of the blade, thereby leaving approximately 1/32 inch gap for accommodating the welding bead 22, thereby assuring proper penetration of the bead.

The dies 40 and 42 hold the ends 36, 38 of the U-band against the heat shield with great force while the bead 22 is formed along the elongated gap left between the ends 36, 38 of the U-band and the faces 32 of the blade. After the weld 22 has been formed on either side of the blade, thereby rigidly attaching the blade and the end of the U-band together, the temperature of the U-band will be raised an average of 200°–300° F., which is a significant amount so far as regards expansion and contraction of the metallic U-band, but which is far below the temperature required to effect any significant change in the characteristics of the sucker rod alloy.

As noted in FIG. 6, the tabs 28 located at the opposed marginal ends of the blade are locked into the slot 20 of the heat shield. The tabs have an innermost edge portion which lies against the outer surface of the sucker rod, thereby effectively "keeping" or "locking" the heat shield to the blade and rod. Accordingly, no matter how much the scraper assembly is abused, the heat shield can never be loosened from the scraper assembly and fall downhole in the borehole.

Moreover, as noted in FIG. 4, the heat shield is deformed into a curve so that its innermost surface is made complementary respective to the outermost surface of the sucker rod. The U-band likewise is deformed about the outer surface of the sucker rod and has a curvature which is made complementary respective to the curvature of the rod for a circumferentially extending distance of approximately 270° at a location on the rod which is opposed to the heat shield. As seen in FIG. 3, the U-band curved inner surface leaves the sucker rod outer surface and joins to the heat shield outer surface, forming an air gap of progressive width between the U-band and the sucker rod. Accordingly, as the weld 22 is jointly formed on the blade and the marginal terminal ends of the U-band, heat is radiated into the blade and into the U-band. The heat shield isolates the hottest part of the U-band from the outer surface of the sucker rod, with the U-band and blade each forming a heat sink so that the U-band is heated to approximately 200°–300° F. as a result of the welding process, while the blade is heated to an average which is much less than this value due to the difference in mass and the heat transfer characteristics of the blade and the U-band. Of course, the area immediately adjacent to the weld 22 is instantaneously heated to several thousand degress fahrenheit in order to effect a suitable joinder of the welding bead to both the U-band and the blade; however, the heat sink characteristics of the blade and U-band, together with the novel air spaces and heat shield, prevent the rod surface from ever reaching a temperature elevation which can effect any significant change in the alloy composition of the sucker rod.

The slot 20 can be formed through the heat shield, or alternatively, the slot can be left with a bottom, which provides a groove in contradistinction to a slot. In carrying out the method of fabricating the sucker rod scraper 12 of the present invention, it is preferred to deform the washer 32 into the spiral blade 16 seen in FIG. 1; and thereafter to utilize two sets of duel jaws 40, 42 at apaced locations so that the U-bands can be simultaneously deformed about the rod surface, and the welding 22 rapidly effected in a sequential manner at the upper and lower clamping members.

The present invention provides a method by which a scraper can rapidly be built in situ at spaced intervals along a sucker rod without injuring the characteristics of the rod alloy. The clamping members rigidly affix the opposed ends of the blade to the rod with great frictional forces. The method of the present invention provides a means by which the scraper blade is rapidly and efficiently mounted to the sucker rod. The cost of the material, as well as the labor, for fabricating the rod is nominal. The present invention provides a clamping member at each end of blade which will not loosen from the rod with use, and further provides a paraffin scraper and rod guide fabricated in a manner whereby none of the component parts can become loosened and fall downhole into the borehole.

I claim:

1. A method of making and attaching a spiral scraper assembly onto the exterior of a sucker rod comprising the steps of:
   (1) forming a blade into a spiral which is wound about the surface of the rod;
   (2) forming an inwardly directed tab at opposed marginal ends of the blade;
   (3) placing a discontinuous U-band about the rod and at each marginal end of the spiral, and placing the confronting edges of the U-band closely adjacent to each of the tabs;
   (4) placing a heat shield under the confronting marginal ends of the U-band; and,
   (5) welding the opposed ends of the blade to the marginal ends of the U-bands.

2. The method of claim 1 and further including the step of forming a slot centrally of the heat shield, placing the tab within the slot, and then carrying out step (5).

3. The method of claim 2 and further including the step of forming the tab by spaced cut-outs placed at the marginal ends of the blade to thereby leave said tab of a dimension to be received within the slot; and,
   resting the edge of the cut-out within the cavity formed by confronting edges of the U-band.

4. The method of claim 2 and further including the step of holding the U-band against the rod surface during the welding step so that subsequent cooling shrinks the band into tight engagement with the rod.

5. The method of claim 1 and further including the step of forming the tab by spaced cut-outs placed at the marginal ends of the blade to thereby leave said tab of a dimension to be received within the slot; and,
   resting the edge of the cut-out within the cavity formed by confronting edges of the U-band.

6. The method of claim 5 and further including the step of holding the U-band against the rod surface during the welding step so that subsequent cooling shrinks the U-band into tight engagement with the rod.

7. The method of claim 1 and further including the steps of arranging adjacent scrapers into a right and left hand spiral.

8. A sucker rod having a paraffin scraper and rod guide mounted to the surface thereof, the improvement comprising:
   said scraper and guide comprises spaced clamping members; a spiral blade having the marginal ends thereof rigidly affixed to said clamping members;
   said clamping members each include a U-band which embraces the rod surface, said U-band confronting edges and the marginal end of the blade received therebetween; a heat shield underlying the marginal confronting edges of the U-band and separating said marginal confronting edges from the rod surface;
   a bead of welding attaches the edges of the U-band to the marginal end of the blade;
   so that the heat shield protects the rod surface during the welding operation while the U-band is being attached to the end of the blade.

9. The improvement of claim 8 wherein said heat shield includes a slot formed therein, each said opposed end of the blade includes a tab formed thereon which extends radially towards the axial centerline of the rod, said tab is received within said slot and separates the marginal ends of the U-band.

10. The improvement of claim 9 wherein the inner surface of said heat shield is placed against the outer surface of said rod, and the opposed outer edges of said heat shield describe an arc of less than 90°.

11. The improvement of claim 10 wherein there are a plurality of scrapers on each rod, and adjacent scrapers are spiraled one to the right and the other to the left, said U-band is separated from said rod surface for a limited circumferential length at the termination of the heat shield.

12. The improvement of claim 8 wherein said heat shield includes a slot formed therein, each said opposed end of the blade includes a tab formed thereon which extends radially towards the longitudinal axis of the rod; said tab is received within said slot and separates the marginal edges of the U-band.

13. The improvement of claim 12 wherein the inner surface of said heat shield is placed against the outer surface of said rod, and the opposed outer edges of said heat shield describe an arc of less than 90°;
   wherein there are a plurality of scrapers on each rod, and adjacent scrapers are spiraled in opposite pitch, said U-band is separated from said rod surface for a limited circumferential length where the heat shield terminates.

14. In a paraffin scraper including a blade thereon, there being a scraper located at spaced intervals along and concentrically of a sucker rod, the combination of said rod and scraper of an improved attachment by which each end of said blade is rigidly affixed to the rod surface;
   said blade has radial tabs aligned perpendicularly respective to the rod axis; said attachment means includes an apertured heat shield and a U-band, wherein the U-band has adjacent edges rigidly weldedly joined to the marginal ends of the blade, with said heat shield underlying the blade and the U-band; said tab is received within the aperture of said heat shield;

whereby the heat shield protects the rod surface from undue heat during the joining of the blade to the U-band, and effects an interference fit between the attachment means and the rod.

15. The combination of claim 14 wherein said apertured heat shield includes a slot formed therein, each said opposed end of the blade includes said tab thereon which extends radially towards the axial centerline of the rod, said tab is received within said slot and separates the marginal ends of the U-band from the rod surface.

* * * * *

UNITED STATES PATENT AND TRADEMARK OFFICE
CERTIFICATE OF CORRECTION

PATENT NO. : 4,532,988

DATED : August 6, 1985

INVENTOR(S) : ALVIN E. HICKMAN

It is certified that error appears in the above-identified patent and that said Letters Patent is hereby corrected as shown below:

Column 2, line 22, substitute --within-- for "with".

Column 6, line 17, insert --has-- before "confronting";

Line 62, insert --means-- after "attachment".

Signed and Sealed this

Twenty-ninth Day of October 1985

[SEAL]

Attest:

DONALD J. QUIGG

Attesting Officer

Commissioner of Patents and Trademarks—Designate